(12) United States Patent
Mundinger et al.

(10) Patent No.: US 8,398,363 B2
(45) Date of Patent: Mar. 19, 2013

(54) DEVICE FOR SEALING A BEARING HOUSING OF AN EXHAUST GAS TURBOCHARGER

(75) Inventors: Gerd Mundinger, Wettingen (CH); Joel Schlienger, Zürich (CH); Matthias Kies, Regensburg (DE); Patrick Aberle, Untersiggenthal (CH)

(73) Assignee: ABB Turbo Systems AG, Baden (CH)

( * ) Notice: Subject to any disclaimer, the term of this patent is extended or adjusted under 35 U.S.C. 154(b) by 116 days.

(21) Appl. No.: 13/116,702

(22) Filed: May 26, 2011

(65) Prior Publication Data

US 2011/0223010 A1 Sep. 15, 2011

Related U.S. Application Data

(63) Continuation of application No. PCT/EP2009/065266, filed on Nov. 17, 2009.

(30) Foreign Application Priority Data

Nov. 28, 2008 (EP) .................................. 08170180

(51) Int. Cl.
*F01D 25/16* (2006.01)
*F01D 25/18* (2006.01)

(52) U.S. Cl. .................. 415/111; 415/112; 415/170.1; 415/229; 416/174

(58) Field of Classification Search .............. 415/111, 415/112, 170.1, 229; 416/174; 417/407
See application file for complete search history.

(56) References Cited

U.S. PATENT DOCUMENTS

| 4,664,605 | A | 5/1987 | Asano et al. |
| 4,789,253 | A | 12/1988 | Perego et al. |
| 5,246,352 | A * | 9/1993 | Kawakami ............... 417/407 |
| 6,418,722 | B1 * | 7/2002 | Arnold .................... 417/407 |
| 2002/0158418 | A1 | 10/2002 | Thiesemann et al. |
| 2010/0139270 | A1 | 6/2010 | Koch et al. |

FOREIGN PATENT DOCUMENTS

| CH | 673052 A5 | 1/1990 |
| EP | 0834645 A1 | 4/1998 |
| JP | 07-217441 A | 8/1995 |
| JP | 09-041982 A | 2/1997 |

(Continued)

OTHER PUBLICATIONS

International Search Report (PCT/ISA/210) issued on Dec. 30, 2009, by European Patent Office as the International Searching Authority for International Application No. PCT/EP2009/065266.

(Continued)

*Primary Examiner* — Igor Kershteyn
(74) *Attorney, Agent, or Firm* — Buchanan Ingersoll & Rooney PC

(57) ABSTRACT

A device for sealing a bearing housing, which holds lubricating oil, from which a rotor supported inside the housing of an exhaust gas turbocharger is guided into a compressor housing, loadable by a mass flow of a charger. The device includes a fixed partition with a wall extension, a sealing disk fastened on a shaft of the rotor, a separating gap arranged between the sealing disk and the wall extension, and a drip device connected to an oil-collecting channel and directs lubricating oil collected in the oil-collecting channel into an oil drain by gravity. The drip device includes a drain-off surface for lubricating oil, which has a large axial distance from a rotating sealing disk which delimits the separating gap. Lubricating oil which can penetrate into the separating gap is guided into an oil drain of the bearing housing without interacting with the sealing disk.

17 Claims, 3 Drawing Sheets

FOREIGN PATENT DOCUMENTS

WO    WO 2008/042698 A1    4/2008

OTHER PUBLICATIONS

European Search Report issued on Apr. 7, 2009.
Notification Concerning Transmittal of International Preliminary Report on Patentability (Forms PCT/IB/326 and PCT/IB/373) and the Written Opinion of the International Searching Authority (Form PCT/ISA/237) issued on Jun. 9, 2011, in the corresponding International Application No. PCT/EP2009/065266.
Notification of Transmittal of Translation of the International Preliminary Report on Patentability (Forms PCT/IB/338 and PCT/IB/373) and the Written Opinion of the International Searching Authority (Form PCT/ISA/237) issued on Jun. 9, 2011, in the corresponding International Application No. PCT/EP2009/0065266.

* cited by examiner

DEVICE FOR SEALING A BEARING HOUSING OF AN EXHAUST GAS TURBOCHARGER

RELATED APPLICATIONS

This application claims priority as a continuation application under 35 U.S.C. §120 to PCT/EP2009/065266, which was filed as an International Application on Nov. 17, 2009 designating the U.S., and which claims priority to European Application 08170180.7 filed in Europe on Nov. 28, 2008. The entire contents of these applications are hereby incorporated by reference in their entireties.

FIELD

The disclosure relates to the field of exhaust gas turbochargers, and to a device for sealing a bearing housing which holds a lubricating oil.

BACKGROUND INFORMATION

In an exhaust gas turbocharger, the exhaust gases of an internal combustion engine can be used for compressing the combustion air which is fed to the engine. With precompressed or charged combustion air, the capacity, and therefore also the fuel mixture in the cylinders of the engine, can be increased and a power increase for the engine is gained. A known exhaust gas turbocharger includes a rotor with a compressor impeller, a turbine wheel and a connecting shaft, a bearing arrangement, housing sections, such as compressor housing or turbine housing which are fixed and charged with a mass flow, and a bearing housing which accommodates the bearing arrangement.

Because of the mostly high process pressures in the turbine-side and also compressor-side flow regions, the turbocharger shaft is sealed in relation to the inner plenum of the bearing housing by a suitable sealing method. The internal pressure in the plenum of the bearing housing can correspond to an atmospheric pressure of 1 bar. By contrast, the gas pressure in the flow region of the compressor side and turbine side depends upon the current operating point of the turbocharger and in most cases can lie above the plenum pressure of the bearing housing. In order to counteract pressure equalization, the section of the rotor which is supported in the bearing housing is therefore guided out of the bearing housing via two seals, of which one seals the bearing housing in the direction of the compressor and the other in the direction of the turbine. In certain cases a negative pressure in the compressor housing or in the turbine housing should be taken into consideration, for example, during partial load operation or during a shutdown period, when lubricating oil can find its way from the bearing housing into the turbine housing or compressor housing. In the compressor housing, penetrating lubricating oil could contaminate the charged compressor air and subsequently lead to unwanted emissions by combusting in the engine.

Exhaust gas turbochargers with sealing devices of this type are described in CH 673 052 A5 and in EP 0 834 645 A1. These devices can seal a bearing housing which holds lubricating oil, from which a rotor supported inside the casing of an exhaust gas turbocharger is guided into a compressor housing which is chargeable by a mass flow of the charger. The devices have a partition which separates an oil-collecting chamber, which is enclosed by a bearing housing of the turbocharger, and an impeller backspace of a compressor housing, from each other. In addition, the devices have a sealing disk which is fastened on a shaft of a turbocharger rotor and a collecting channel for lubricating oil which discharges from the bearing of the rotor into the oil-collecting chamber. The discharging lubricating oil can be thrown outwards by a rotating sealing disk, impinge upon the bearing-housing wall, run along the wall into the oil-collecting channel, flow via the channel downwards into an oil drain and from there flow back again into the oil circuit of the bearing lubricating system. A seal which is arranged between a rotor and a partition can ensure that different pressures in the spaces which are enclosed by the compressor housing and the bearing housing do not lead to unwanted compensating flows. The seal, as shown in CH 673 052 A5, can be constructed as a sealing ring and be arranged in a separating gap between the rotating sealing disk and the partition but as shown in EP 0 834 645 A1, can also be a labyrinth seal which is arranged in the impeller backspace between the impeller and the partition.

Further embodiments of sealing devices are also described in WO 2008/042698 A1. These sealing devices can have an oil-collecting channel which is formed in a fixed partition and arranged in an oil-collecting chamber. Lubricating oil which flows from a shaft bearing of an exhaust gas turbocharger via an axial bearing gap into the oil-collecting chamber can be thrown against the wall of the oil-collecting chamber, flow along the wall into the channel, and via the channel flow downwards into an oil drain. In the lower part of the channel, the oil can flow down on the right-hand and on the left-hand channel walls. Because the separating gap, which is provided between rotor and partition, leads into one of these two channel walls, at operating points with negative pressure on the compressor side that the separating gap is evacuated, despite seals being disposed in between, oil can find its way via these seals into the compressor of the turbocharger and as a result, into the intake air of an internal combustion engine.

U.S. Pat. No. 4,664,605 describes a further sealing device which can prevent penetration of lubricating oil from the shaft bearing of an exhaust gas turbocharger into the compressor. This sealing device has an oil-collecting chamber which by a shielding plate 15 is divided into two sub-chambers. The lubricating oil which discharges radially from an axial bearing of the turbocharger can be thrown outwards, impinge upon the shielding plate 15 of a first sub-chamber, is collected in a channel 45 which is formed in the plate 15 and via openings 57, 59 and a tongue 17A and is transported into an oil drain 27. The discharging lubricating oil can also find its way into a second sub-chamber 16 of the oil-collecting chamber. The oil can then be guided along a partition 10, which separates the sub-chamber 16 from an impeller backspace 1d of the compressor, downwards into the oil drain 27. In so doing, however, it can find its way into a separating gap which is arranged between a sealing disk 14, which is fastened and therefore rotates on the rotor 7 of the turbocharger, and the fixedly mounted partition 10. In the separating gap, there is a seal 11 which seals the impeller backspace 1d in relation to the sub-chamber 16 of the oil-collecting chamber but which during operation of the turbocharger can be impermissibly heavily loaded by lubricating oil which can penetrate from the sub-chamber 16 into the separating gap.

A device for addressing penetration of lubricating oil from the shaft bearing of an exhaust gas turbocharger into the compressor is disclosed in JP 07/217,441 A. This sealing device also has an oil-collecting chamber which is divided into two sub-chambers by a shielding plate. The lubricating oil which discharges radially from an axial bearing of the turbocharger can be thrown outwards, impinge upon a shielding plate 41 of a first sub-chamber and run down along the plate in a part 41e into a bearing-housing plenum and back again into an oil circuit of a bearing lubricating system. Through a gap in a part 41d, oil can find its way along a centrifugal disk 42 into a second chamber 40. The oil runs along a partition 30 downwards into a channel and further, in a part 30b, into the bearing-housing plenum. In this case, the channel is formed from a wall extension 30d of the partition and a rotating part of the flank 42 (FIG. 7). In the lower sector of the wall extension 30d, two drip edges 30e of a drip device for the oil are formed. In between them, however, in the upper sector, lies an axially extended gap which separates a rotor of the turbocharger from a fixed partition and which can be filled with oil. At operating points with negative pressure on a compressor side, despite installing a seal 35 in the separating gap, the separating gap can be evacuated and oil can find its way via the seal 35 into the compressor.

SUMMARY

A device is disclosed for sealing a bearing housing which holds a lubricating oil, from which an exhaust gas turbocharger rotor which is supported inside the housing is guided into a compressor housing, which is loadable by a mass flow of a charger, the device including a partition for separating an oil-collecting chamber enclosed by the bearing housing and an impeller backspace of the compressor housing from each other, the partition having an axially extending wall extension for guidance annularly around the rotor, an annular sealing disk for fastening on a shaft of the rotor and for projecting into the oil-collecting chamber, a separating gap arranged between the sealing disk and the wall extension, a seal for arrangement between the rotor and the partition, a first oil-collecting channel formed in a surface of the wall extension for arrangement in the oil-collecting chamber; and a drip device connected to the first oil-collecting channel for directing lubricating oil collected in the oil-collecting channel into an oil drain by gravity, wherein the drip device is formed in a lower sector of an end face of the wall extension, which is to lie beneath a rotational axis of the rotor for delimiting the separating gap, the drip device including a drain-off surface for lubricating oil and for orientation substantially perpendicularly to a rotational axis of the rotor and for axial offset towards the impeller backspace in relation to a remaining part of the end face.

BRIEF DESCRIPTION OF THE DRAWINGS

An exemplary embodiment of a sealing device according to the disclosure is subsequently shown and explained in more detail with reference to the drawings. In all the drawings, elements which function in the same way are provided with the same designations. In the drawings.

DETAILED DESCRIPTION

The disclosure relates to a device for sealing a bearing housing, which holds lubricating oil, from which the rotor, which is supported inside the housing of an exhaust gas turbocharger is guided into the compressor housing of the charger, wherein the drain-off behavior of lubricating oil in an oil-collecting chamber of the sealing device and therefore also the leak-tightness of the sealing device of the turbocharger can be improved. The disclosure also relates to an exhaust gas turbocharger with this sealing device.

In a sealing device according to an exemplary embodiment of the disclosure, a drip device is formed in a lower sector, lying beneath the rotational axis of the rotor, of an end face, which delimits the separating gap of the wall extension. The drip device includes a drain-off surface for the lubricating oil which is oriented predominantly perpendicularly to the rotational axis of the rotor and is axially offset towards the impeller backspace in relation to the remaining part of the end face.

The drip device includes a drain-off surface for lubricating oil which has a large axial distance from a rotating sealing disk which delimits the separating gap. Lubricating oil which can possibly penetrate into the separating gap can now be guided into an oil drain of the bearing housing without interaction with the sealing disk. Even in the case of evacuation of the separating gap as a result of negative pressure in the impeller backspace of the compressor, as is the case, for example, during a shutdown period or during partial load operation of the turbocharger, drawing in an impermissible amount of oil via the separating gap into the compressor can be prevented in this way.

Figure 1:
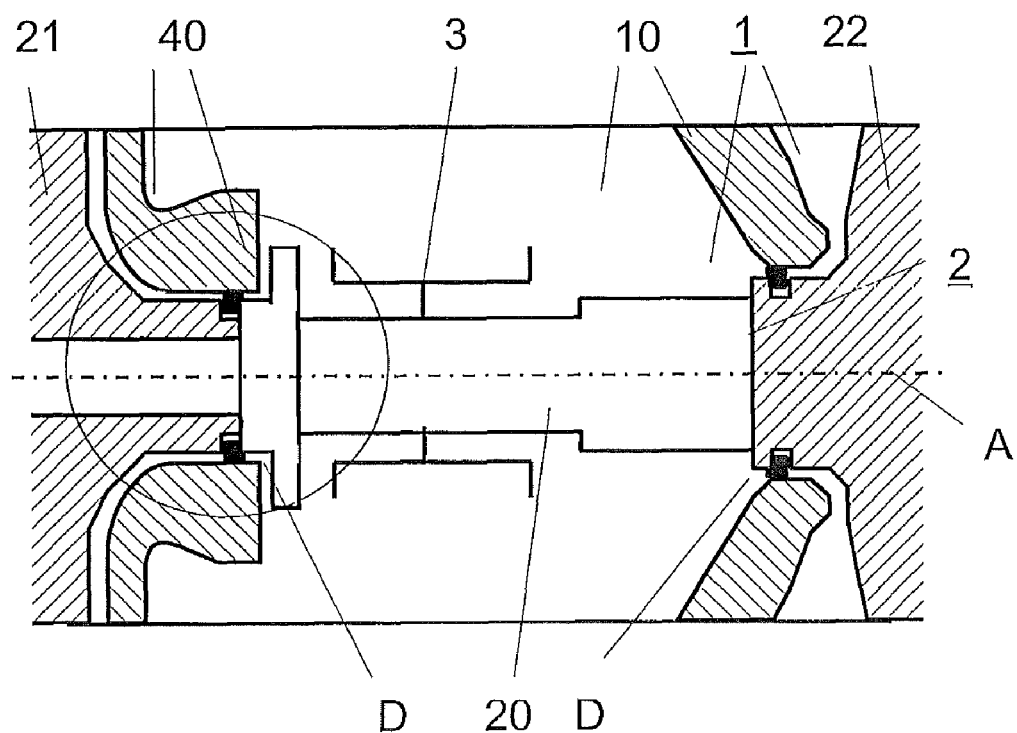
FIG. 1 shows a plan view of an exemplary schematically represented exhaust gas turbocharger, the housing of which is shown sectioned along the axis of its rotor, and which has an encircled sealing device according to an exemplary embodiment of the disclosure.

FIG. 1 schematically shows a partial view of an exemplary embodiment of an exhaust gas turbocharger with a fixedly arranged housing 1 and a rotor 2, being rotatable around an axis A, with a shaft 20. An impeller 21 of the exhaust gas turbocharger is fastened on the left-hand side of the shaft 20. A turbine wheel 22 of the exhaust gas turbocharger is attached on the right-hand side of the shaft 20. The turbine wheel 22 includes blades, which are not shown, via which it can be driven by an exhaust gas flow which is produced in an internal combustion engine. The impeller also includes blades, which are not shown.

In the region, between the two wheels, are arranged axial and radial bearings 3 which absorb the axial and radial forces which occur during guiding of the rotor 2.

The housing 1 encloses the rotor 2 and has a fixed bearing housing 10 which accommodates the axial and radial bearings 3 and a section of the rotor 2 and oppositely shields two remaining parts of the housing 1 in which are arranged the turbine wheel 22, which can be loaded by the hot exhaust gas of the exhaust gas turbocharger and the impeller 21 which is provided for compressing the air. The axial and radial bearings 3 can thus be protected against mass flows which contain exhaust gas or compressed air and which can have high pressure, high temperature and high velocity. So that these mass flows cannot have an effect in the bearing housing 10 and so that reciprocally, no lubricating oil can escape either from the bearing housing 10 into the compressor and into the exhaust gas turbine, provision is made for two shaft seals D, of which one is located on a section of the bearing housing through which the rotor 2 is guided into the compressor, and the other is located on a section of the bearing housing through which the rotor 2 is guided into the exhaust gas turbine.

Figure 2:
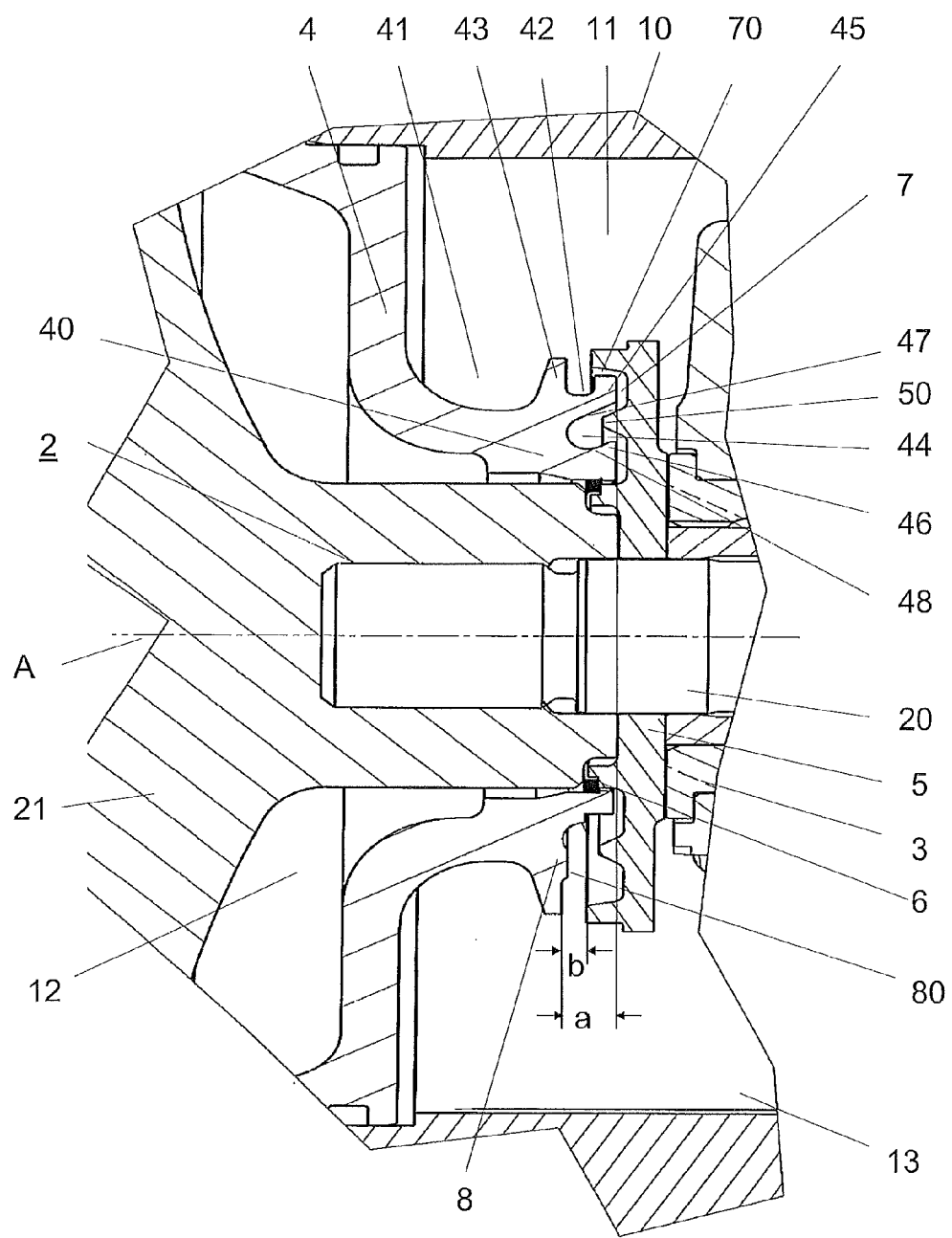
FIG. 2 shows a detailed view of the sealing device which is encircled in FIG. 1.
Figure 3:
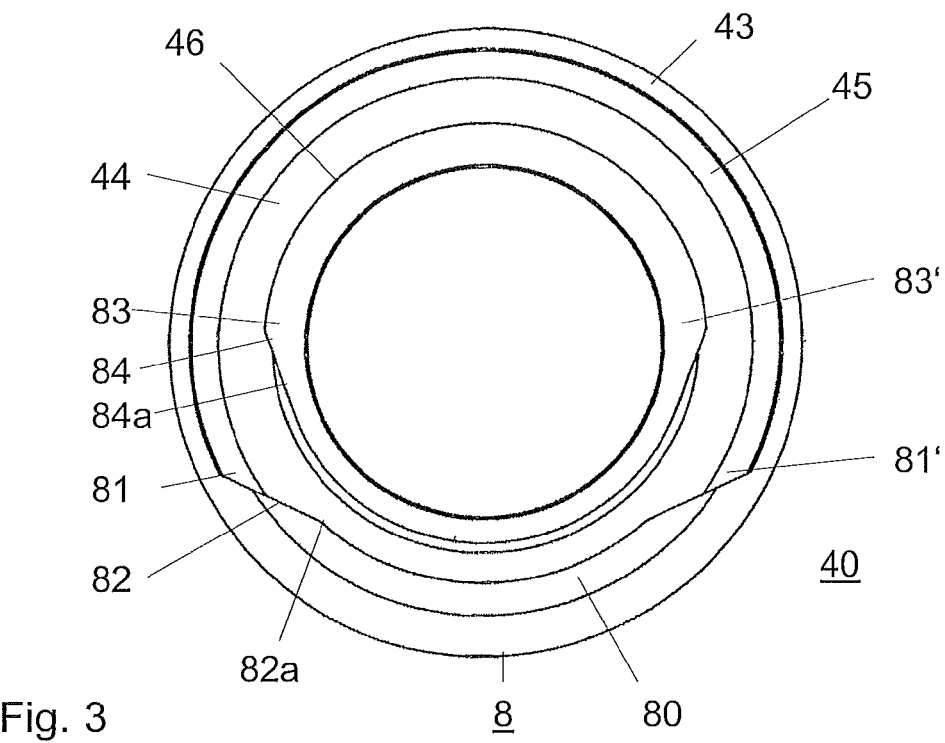
FIG. 3 shows a plan view from the right of an end face of a wall extension of a partition of the sealing device according to FIG. 2.
Figure 4:
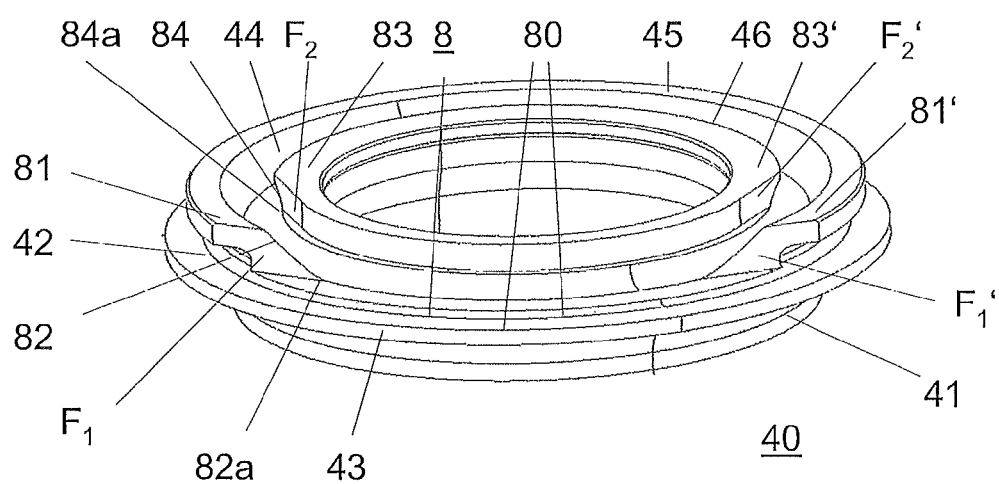
FIG. 4 shows a view of the isometrically represented wall extension according to FIG. 3 from bottom right.

An exemplary embodiment of a shaft seal D, which is arranged on the compressor side, is schematically represented in FIGS. 2 to 4. It includes a partition 4 which separates an oil-collecting chamber 11, which is enclosed by the bearing housing 10, from an impeller backspace 12 of the compressor. The partition 4 has an axially extended wall extension 40 which is guided annularly around the rotor 2. A sealing disk 5 is fastened on the shaft 20 so that it is between the bearing 3 and the impeller 21. At least one seal 6 is located between the sealing disk 5 and the impeller backspace 12, which is delimited by the partition 4 and the impeller 21 of the compressor. The seal 6 can include one or more piston rings and can be installed in a section of the separating gap 7 which is arranged between drip device 8 and impeller backspace 12. The seal can also be constructed as a labyrinth seal and can be installed horizontally in the impeller backspace 12 between the impeller 21 and the partition 4. In each case, the seal can seal a separating gap 7 which is arranged between the sealing disk 5 and the wall extension 40 which is guided annularly around the rotor 2. In a radially outwardly pointing generated surface of the wall extension 40 two oil-collecting channels 41 and 42 can be formed which can be separated from each other by an encompassing rib 43. A further oil-collecting channel 44 can be formed in an end face, which delimits a predominantly radially oriented section of the separating gap 7, of the wall extension 40.

The oil-collecting channel 42 and the separating gap 7, as well as the two oil-collecting channels 42 and 44, are separated from each other by a wall projection 45 which is formed in the wall extension 40. The wall projection 45 can be formed as an open ring. This open ring can be achieved during the manufacture of the sealing device D by the wall projection 45, which can initially be formed as a closed ring, has a cut-out which can be formed by cutting machining. A drip device 8 can thus be created with two ends 81 and 81' which are seen in FIGS. 3 and 4 and which are arranged in a lower sector, located beneath the rotational axis A, of an end face of the wall extension 40 which delimits the separating gap 7. A surface F1 and F1' (FIG. 4), which is extended from the wall projection 45 to a drain-off surface 80 of the drip device 8, can be formed in the two ends 81 and 81'. Of this surface, only one edge is to be seen in FIG. 3, being identified by the designation 82 only on the end 81.

The oil-collecting channel 44 is delimited in relation to the separating gap 7 by a channel edge 46 which is formed as an open ring. The oil-collecting channel also has a surface 47 which encompasses the channel edge and serves for draining off incoming lubricating oil into the base 48 of the oil-collecting channel 44 which is delimited by the channel edge. Two ends 83 and 83' of the channel edge 46, which are guided in the lower sector of the end face of the wall extension 40 and integrated into the drip device 8, have a surface F2 and F2' (FIG. 4) which is extended from the channel edge 46 to the drain-off surface 80. Of this surface, one edge is to be seen in FIG. 3, being identified by the designation 84 only on the end 83.

A drain-off surface 80, which is oriented substantially perpendicularly to the rotational axis A, can be formed as a result of the previously described design of the wall projection 45 or of the channel edge 46 in the lower sector of the end face of the wall extension 40 and is connected via the surfaces $F_1$, $F'_1$ or $F_2$, $F'_2$ to the oil-collecting channels 42, 44 and is offset in the axial direction towards the impeller backspace 12 in relation to the part of the end face located in the upper sector by a distance a, which is to be seen in FIG. 2. At the same time, a large distance b between the drain-off surface 80 and the sealing disk 5 in the axial direction can also be achieved in this way.

During operation of the turbocharger, regardless of whether the bearing 3 is designed as an axial bearing or radial bearing, or as a plain bearing or rolling bearing, lubricating oil can find its way into the oil-collecting chamber 11 through a gap located between the sealing disk 5 and the bearing 3. In a part of the oil-collecting chamber 11 which is located above the rotational axis A, the oil impinges upon the wall of the bearing housing 10 and for the most part runs into the oil-collecting channel 41. In this case, the rib 43, which is extended longer in the radial direction than the separating gap 7, shields a predominantly axially extended inlet section 70 of the separating gap 7 and in the region of the drip device 8 effectively shields the sealing disk 5 against oil sprays from the axial direction. As a result of the shielding effect of the sealing disk 5, moreover, only a little oil can reach the separating gap 7. However, oil which arrives at the separating gap 7, drains away via the oil-collecting channel 42. Oil which possibly finds its way into the separating gap 7 is thrown into the oil-collecting channel 44 by a discharge edge 50 of the sealing disk 5 which is guided annularly around the rotational axis A and projects into the separating gap 7, and from there can run via the drip device 8 into an oil drain 13 of the bearing housing 10 by the effect of gravity. Because the discharge edge 50 projects beyond the separating gap 7 into the oil-collecting channel 44, the oil can be removed from the separating gap 7 in a particularly effective manner and via the radially inwardly curved surface 47 can then find its way into the base 48, which is delimited by the channel edge 46, of the oil-collecting channel 44.

At the ends 83 and 83' which are integrated into the drip device 8, the oil from the channel 44 can find its way into the drip device 8. In so doing, the oil which discharges from the channel 44 can be guided on the surface $F_2$ or $F'_2$ along the edge 84 to the lowest point 84a of the edge. Because this point already lies on the drain-off surface 80, the oil flows on this surface further downwards in order to finally drip into the oil drain 13 at the lower edge of the surface 80. In this case, the axial distance b between the sealing disk 5 and the oppositely disposed drain-off surface 80 is selected to be large enough for dripping or outflowing oil to be shielded from the effect of the rotating sealing disk 5 and can now no longer finds its way as a result of centrifuging action into the upper part of the oil-collecting chamber 11 and consequently into the separating gap 7 again.

The same effect can also be achieved by the suitable configuration of the drip region of the channel 42 and of the wall projection 45. In the case of the oil-collecting channel 42, the oil flows from the channel 42 into the drip device 8 at the ends 81 and 81' of the wall projection 45. In so doing, the oil which discharges from the channel 42 can be guided on the surface $F_1$ or $F'_1$ along the edge 82 to the lowest point 82a of the edge. Because this point also already lies on the drain-off surface 80, the oil flows on this surface further downwards in order to finally drip into the oil drain 13 on the lower edge of the surface 80.

Oil which penetrates into the separating gap 7 can therefore be effectively transported in the direction of the oil drain 13. Even in the case of evacuation of the separating gap 7 as a result of negative pressure in the impeller backspace 12, the suitably designed sealing device D can prevent the drawing in of impermissible amounts of oil via the separating gap 7 into the compressor.

During a shutdown period (e.g., with the sealing disk 5 not rotating, and continuing oil supply), the discharge edge 50 is not active. All other previously described features of the sealing device according to the disclosure, such as the function of the oil-collecting channels 41 and 42 and the shielding of the separating gap 7 by the wall projection 45, the shielding effect of the sealing disk 5 and the flow and drip behavior of the drip device 8, can be maintained, however.

It will be appreciated by those having ordinary skill in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| List of designations | |
|---|---|
| A | Rotational axis |
| D | Seal |
| $F_1, F'_1, F_2, F'_2$ | Surfaces |
| a, b | Distances |
| 1 | Housing |
| 10 | Bearing housing |
| 11 | Oil-collecting chamber |
| 12 | Impeller backspace |
| 13 | Oil drain |
| 2 | Rotor |
| 20 | Shaft |
| 21 | Impeller |
| 22 | Turbine wheel |
| 3 | Bearing |
| 4 | Partition |
| 40 | Wall extension |
| 41, 42, 44 | Oil-collecting channels |
| 43 | Rib |
| 45 | Wall projection |
| 46 | Channel edge |
| 47 | Surface |
| 48 | Channel base |
| 5 | Sealing disk |
| 50 | Discharge edge |
| 6 | Seal |
| 7 | Separating gap |
| 70 | Inlet section |
| 8 | Drip device |
| 80 | Drain-off surface |
| 81, 81' | Ends of wall projection 45 |
| 82 | Edge |
| 82a | Lowest point of the edge 82 |
| 83, 83' | Ends of channel edge 46 |
| 84 | Edge |
| 84a | Lowest point of the edge 84 |

What is claimed is:

1. A device for sealing a bearing housing which holds a lubricating oil, from which an exhaust gas turbocharger rotor which is supported inside the housing is guided into a compressor housing, which is loadable by a mass flow of a charger, the device comprising:
a partition for separating an oil-collecting chamber enclosed by the bearing housing and an impeller backspace of the compressor housing from each other, the partition having an axially extending wall extension for guidance annularly around the rotor;
an annular sealing disk for fastening on a shaft of the rotor and for projecting into the oil-collecting chamber;
a separating gap arranged between the sealing disk and the wall extension;
a seal for arrangement between the rotor and the partition;
a first oil-collecting channel formed in a surface of the wall extension for arrangement in the oil-collecting chamber; and
a drip device connected to the first oil-collecting channel for directing lubricating oil collected in the oil-collecting channel into an oil drain by gravity;
wherein the drip device is formed in a lower sector of an end face of the wall extension, to lie beneath a rotational axis of the rotor for delimiting the separating gap, the drip device including a drain-off surface for lubricating oil and for orientation substantially perpendicularly to a rotational axis of the rotor and for axial offset towards the impeller backspace in relation to a remaining part of the end face.

2. The device as claimed in claim 1, comprising:
a wall projection, formed as a ring, in the wall extension for separating the first oil-collecting channel and the separating gap from each other; and
a cut-out in the lower sector of the end face forming the drip device.

3. The device as claimed in claim 2, comprising:
a second oil-collecting channel connected to the drip device formed in the end face of the wall extension delimited in relation to the separating gap by a channel edge formed as an open ring, and having a surface which encompasses the channel edge for draining away incoming lubricating oil into a base delimited by the channel edge of the second oil-collecting channel.

4. The device as claimed in claim 3, wherein the first and the second oil-collecting channels are separated from each other by the wall projection, the wall projection having two ends which are integrated into the drip device, the device comprising:
a surface, formed in the two ends and extending from the wall projection to the drain-off surface for guiding lubricating oil which discharges from the first oil-collecting channel onto the drain-off surface.

5. The device as claimed in claim 4, wherein the drip device comprises:
two ends of the channel edge, each having a surface which extends from the channel edge to the drain-off surface for guiding lubricating oil which discharges from the second oil-collecting channel onto the drain-off surface.

6. The device as claimed in claim 1, comprising:
an upper sector to lie above a rotational axis of the rotor, the separating gap having a substantially axially oriented inlet section, the device comprising:
a third oil-collecting channel, formed in the surface of the wall extension which is separated from the first oil-collecting channel by an annular rib for guidance around the rotational axis, for shielding an inlet section of the separating gap and for shielding the sealing disk against oil spray in a region of the drip device.

7. The device as claimed in claim 3, wherein the sealing disk has at least one discharge edge for guidance annularly around the rotational axis and for projecting into the separating gap.

8. The device as claimed in claim 7, wherein the discharge edge projects beyond the separating gap into the second oil-collecting channel.

9. The device as claimed in claim 1, wherein the seal is a piston ring and is installed in a section of the separating gap which is arranged between the drip device and the impeller backspace.

10. The device as claimed in claim 1, wherein the seal is a labyrinth seal and is installed horizontally in the impeller backspace between the impeller and the partition.

11. The device as claimed in claim 5, comprising:
an upper sector to lie above a rotational axis of the rotor, the separating gap having a substantially axially oriented inlet section, the device comprising:
a third oil-collecting channel, formed in the surface of the wall extension which is separated from the first oil-collecting channel by an annular rib for guidance around the rotational axis, for shielding an inlet section of the separating gap and for shielding the sealing disk against oil spray in a region of the drip device.

12. The device as claimed in claim 5, wherein the sealing disk has at least one discharge edge for guidance annularly around the rotational axis and for projecting into the separating gap.

13. The device as claimed in claim 6, wherein the sealing disk has at least one discharge edge for guidance annularly around the rotational axis and for projecting into the separating gap.

14. The device as claimed in claim 5, wherein the seal is a piston ring and is installed in a section of the separating gap which is arranged between the drip device and the impeller backspace.

15. The device as claimed in claim 5, wherein the seal is a labyrinth seal and is installed horizontally in the impeller backspace between the impeller and the partition.

16. The device as claimed in claim 1, in combination with an exhaust gas turbocharger, the combination comprising:
   a bearing housing;
   a rotor supported inside the bearing housing; and
   a compressor housing, the rotor being guided from the bearing housing to the compressor housing, wherein the device for sealing is located between the bearing housing and the compressor housing.

17. The device as claimed in claim 16, comprising:
   lubricating oil in the bearing housing; and
   a compressor.

* * * * *